(12) United States Patent
Paine et al.

(10) Patent No.: US 6,348,179 B1
(45) Date of Patent: Feb. 19, 2002

(54) SPHERICAL BORON NITRIDE PROCESS, SYSTEM AND PRODUCT OF MANUFACTURE

(75) Inventors: Robert T. Paine; William J. Kroenke; Eugene A. Pruss, all of Albuquerque, NM (US)

(73) Assignee: University of New Mexico, Albuquerque, NM (US)

( * ) Notice: Subject to any disclaimer, the term of this patent is extended or adjusted under 35 U.S.C. 154(b) by 0 days.

(21) Appl. No.: 09/315,097

(22) Filed: May 19, 1999

(51) Int. Cl.[7] .................... C01B 21/064; C01B 35/10
(52) U.S. Cl. ..................................... 423/277; 432/290
(58) Field of Search ............................ 423/290, 277

(56) References Cited

U.S. PATENT DOCUMENTS

| | | | | |
|---|---|---|---|---|
| 3,352,637 A | * | 11/1967 | Heymer et al. | 423/290 |
| 4,784,978 A | * | 11/1988 | Ogasawara et al. | 423/290 |
| 4,971,779 A | * | 11/1990 | Paine, Jr. et al. | 423/290 |

FOREIGN PATENT DOCUMENTS

| | | |
|---|---|---|
| EP | 0137652 A | 8/1985 |
| EP | 0170817 | 12/1985 |
| EP | 0 396 448 A1 | 4/1990 |
| EP | 0396448 | 11/1990 |
| JP | 6020811 A | 1/1992 |
| JP | 60155507 | 2/1992 |
| WO | WO 98/36887 | 8/1998 |

* cited by examiner

Primary Examiner—Wayne Langel
(74) Attorney, Agent, or Firm—Anderson Kill & Olick; Eugene Lieberstein; Michael Meller (57) ABSTRACT

The present invention involves a process and system for producing spherical $BN_xO_y$ particles that are converted to crystalline BN. The process involves adding a boron compound to an aqueous solution, creating an aerosol spray from the solution in the form of aerosol droplets using an aerosol generator. The aerosol droplets are fed with an inert carrier gas into a heated furnace at a preset flow rate while simultaneously injecting a gaseous nitriding agent into the heated furnace in a direct proportion to the flow rate of the carrier gas containing the aerosol droplets whereby a precursor of spherically shaped $BN_xO_y$ particles are formed which are further heat treated into particles of spherically shaped BN having a turbostratic or hexagonal structure.

16 Claims, 7 Drawing Sheets

SPHERICAL BORON NITRIDE PROCESS, SYSTEM AND PRODUCT OF MANUFACTURE

FIELD OF THE INVENTION

The present invention relates to a process and system for producing spherical particles of turbostratic or hexagonal boron nitride and to a spherical boron nitride precursor produced by such method.

BACKGROUND OF INVENTION

Boron nitride "BN" is a chemically inert, refractory material which has excellent electrical insulating properties and high thermal conductivity. Accordingly, boron nitride is an ideal candidate as a filler material in organic polymers for use in the electronics industry particularly to encapsulate electrical components, integrated circuits and solid state devices. However, despite such beneficial properties the morphology of boron nitride, as presently manufactured, minimizes its utility for thermal management applications. Boron nitride powder is currently manufactured by high temperature reactions between simple inorganic raw materials and the powder has a hexagonal structure with a platelet morphology. The platelet morphology of boron nitride adversely impacts the volume loading of BN particles as well as the viscosity of the polymer composite during processing. This, in turn, limits its utility as a filler material particularly for thermal management applications. Stated otherwise, its platelet morphology inherently limits the volume ratio of filler to polymer necessary to form molding and underfill compounds possessing the electrical insulating and thermal conductivity properties necessary for thermal management applications in the electronic industry. It is however, anticipated that spherically shaped BN particles will pack more efficiently and form a more dense matrix composite in a polymeric material. This should, in turn, permit achievement of the loading volumes at favorable polymer composite processing viscosities required to form desirable molding, encapsulant and underfill compounds having the desired properties for thermal management applications in the electronics industry.

It is suggested in a literature article entitled "Boron Nitride Powders Formed By Aerosol Decomposition of Poly(borazinylamine) Solutions" authored by Robert Paine et al (J. Am. Ceram. Soc. 74 (12) 3126–28 in 1991), that spherically shaped BN particles may be formed by reacting trichloroborazine with an appropriate aminosilane. The poly (borazinylanine) product is subsequently dissolved in liquid ammonia and injected as an aerosol into a reaction furnace at high temperature. This produces a powdered boron nitride product having an amorphous structure. Thereafter, by calcining (heat-treating) the BN powder in a nitrogen atmosphere at a temperature of 1600° C., over a time period of at least 8 hours, hexagonal BN particles of overall spheroidal shape with protruding non-uniform crystallized blades can be formed. This process is not commercially viable since poly(borazinylamine) is very expensive and at present not yet available commercially. Moreover, the post-heat treatment operation does not produce uniform spherically shaped particles.

Another method for forming spherically shaped BN particles is taught in European Patent Publication No. 0 396 448 published on Nov. 7, 1990. Its basis is the reaction of boron trichloride and gaseous ammonia at high temperature followed by calcination at high temperature in a graphite furnace under vacuum. This method is unattractive because $BCl_3$ is not only an expensive raw material but is also very reactive generating hydrogen chloride gas HCl(g), a corrosive, hazardous, byproduct. In addition, Cl is also an undesirable contaminant for use in thermal management applications.

SUMMARY OF THE INVENTION

A method has been discovered in accordance with the present invention for economically forming spherically shaped precursor $BN_xO_y$ particles and for converting them to spherically shaped BN particles having either a highly crystalline hexagonal structure or a turbostratic structure of lower crystallinity. The process provides a substantial degree of control over the crystallinity of the product as well as over the size of the particles and the BN crystallites that make up the particles within a given size range. Moreover, the concentration of oxygen in the precursor product can be accurately controlled.

The process of the present invention broadly comprises the steps of adding a boron compound to an aqueous solution, creating an aerosol spray from the boron containing aqueous solution in the form of aerosol droplets, injecting the aerosol droplets with an inert carrier gas such as $N_2$ or Ar into a furnace at preset flow rate, maintaining the furnace temperature within a temperature range of between 600° C. and 1500° C., preferably 1000°–1200° C., and injecting a gaseous nitriding agent into the furnace simultaneously with the injection of the aerosol droplets with the flow rate of the gaseous nitriding agent maintained in a direct proportion to the flow rate of the aerosol such that the ratio of flow of the gaseous nitriding agent to said preset flow rate for the carrier gas and aerosol droplets whereby spherically shaped $BN_xO_y$ precursor particles are formed and subsequently heat treating the $BN_xO_y$ precursor particles into particles of spherically shaped BN having either a turbostratic or a hexagonal structure.

The system for forming spherical BN in accordance with the present invention comprises: an aerosol generator for forming an aerosol spray consisting of droplets of an aqueous boron containing compound; a means for injecting a gaseous $N_2$ carrier including said aerosol droplets into a heated furnace at a controlled flow rate, and a means for simultaneously injecting into the furnace a gaseous nitriding agent.

It has been further discovered in accordance with the present invention that the precursor BN product produced before calcining consists of mainly amorphous spherical particles with a complex $BN_xO_y$ composition and under preferred conditions having a controlled oxygen concentration of between about 10 and 35%. Under other conditions higher oxygen concentrations may be realized.

BRIEF DESCRIPTION OF THE DRAWINGS

The advantages of the present invention will become apparent from the following detailed description of the present invention when read in conjunction with the accompanying drawings of which.

DETAILED DESCRIPTION OF THE INVENTION

Figure 1:
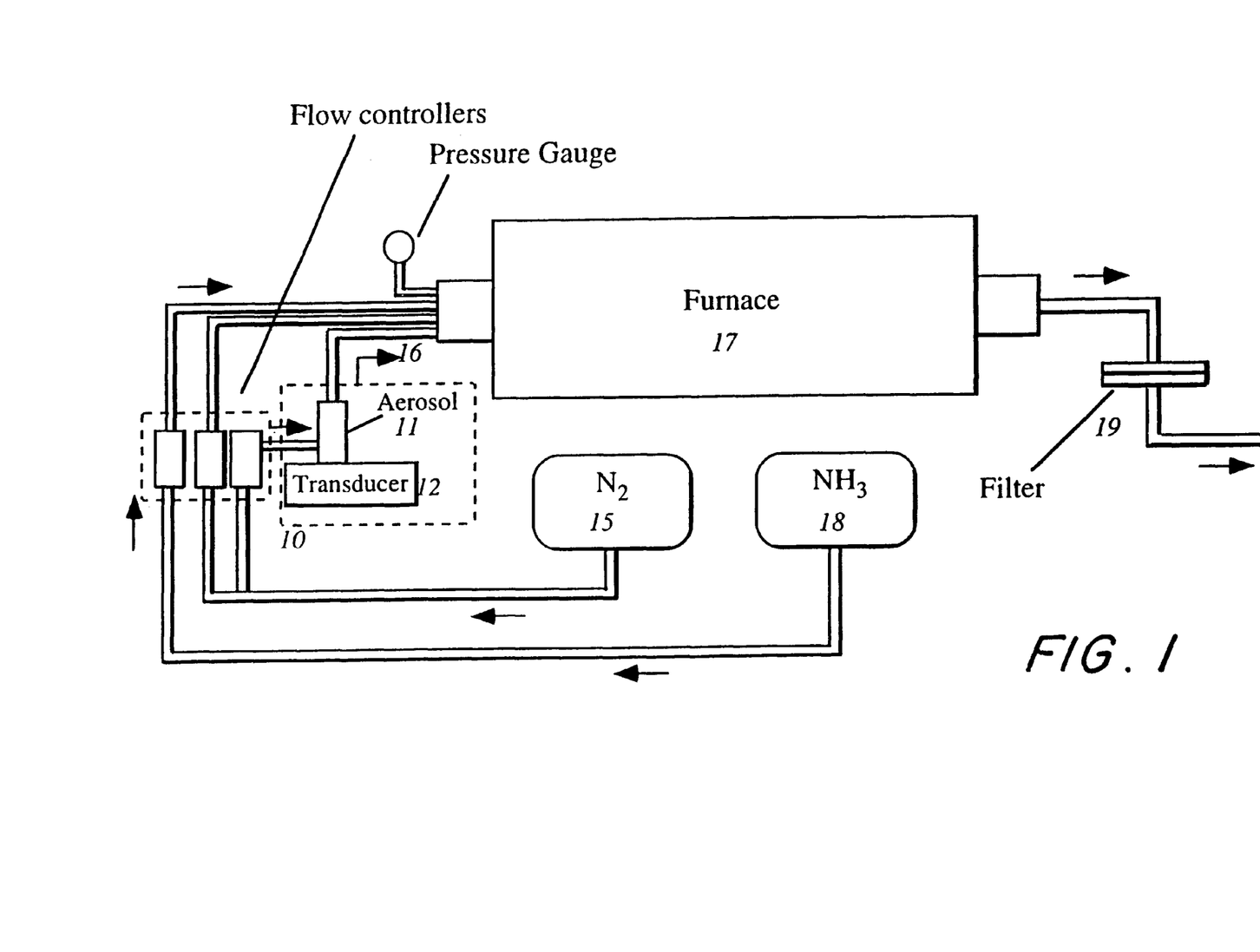
FIG. 1 is a schematic drawing of an aerosol assisted vapor phase reactor system in accordance with the present invention.
Figure 2A:
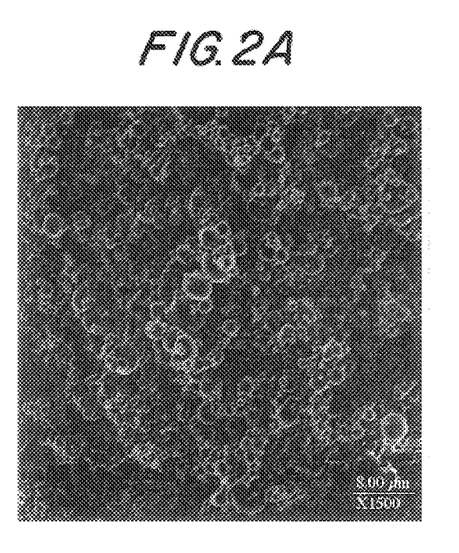
FIG. 2 shows four scanning electron microscope micrographs of the $BN_xO_y$ precursor product of the present invention formed at 1000° C. from boric acid and ammonia at different magnification levels.
Figure 2B:
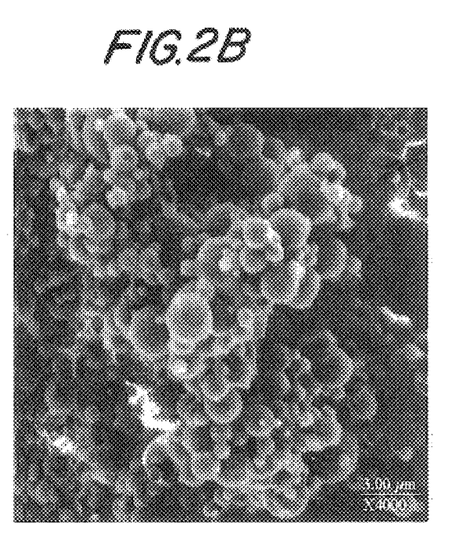
Figure 2C:
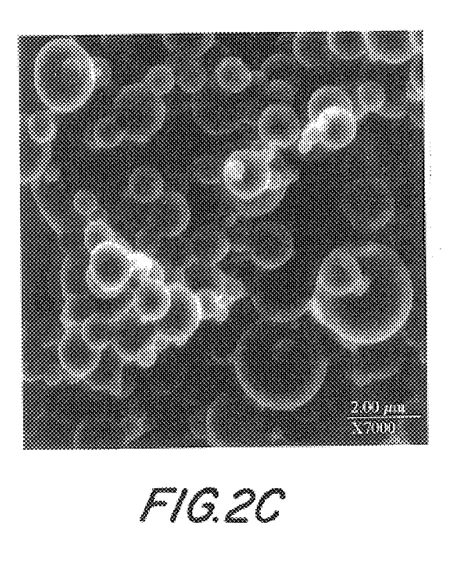
Figure 2D:
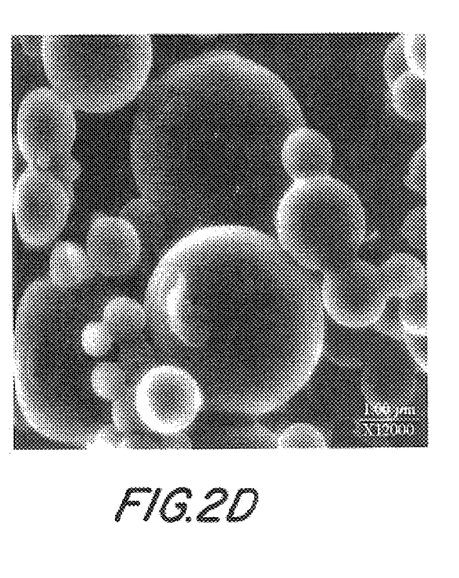

A schematic diagram of an aerosol assisted vapor phase reactor system in accordance with the present invention is shown in FIG. 1 consisting of an aerosol generator 10 for forming an aerosol consisting of aqueous droplets formed from an aqueous solution of boron containing compounds. Boric acid and ammonium pentaborate are the preferred boron precursors. Other less preferred boron precursors which may be used include other ammonium borates such as ammonium tetraborate $(NH_4)_2B_4O_7 \cdot nH_2O$; metaboric acid $(HB_2O)$, boric anhydride $(B_2O_3)$ and complexes of boric acid or boric anhydride with simple organic ligands of relatively low carbon content including complexes or mixtures of boric acid anhydride with hydrazine, alkyl amines, nitrogen rich polyamines, alkyl substituted hydrazines particularly methyl hydrazine and dimethyl hydrazine, hydroxylamine, hydrazoic acid, melamine, urea, biuret, cyanamide and dicyanamide.

Any conventional aerosol generator 10 (FIG. 1) may be used to form an aerosol spray of aqueous droplets of a boron containing compound from an aqueous solution in which the corresponding boron compound is dissolved. The conventional aerosol generator may be selected from the group of known aerosol generators such as atomizers, spray nozzles, nebulizers and ultrasonic aerosol generators or transducers. It should be understood that a variety of different geometries can be employed in the droplet generator apparatus and that different means may be selected for the delivery of the aerosol into the reactor furnace in FIG. 1. The selection of a particular aerosol (droplet) generator and aerosol delivery system depends on the desired droplet size of the aerosol particles, droplet distribution, target aerosol delivery rate and chemical composition of the aerosol forming solution. For example, an impactor (barrier) may be inserted in-line in the aerosol delivery system to change particle size distribution and to decrease the rate of delivery of the aerosol to the reactor. In addition, different spray nozzle designs may be used to vary the size of the aerosol particles in the range of 0.1–100 $\mu$m.

The example aerosol generator 10 identified in FIG. 1 includes a commercial humidifier 11 (e.g. a Holmes Model 643-B) and a transducer 12. A glass chamber (not shown) filled with an aqueous solution containing a dissolved boron precursor is placed in the base unit of the humidifier 11. A polyethylene diaphragm (not shown) is fitted into the bottom of the glass chamber. The aqueous solution in the humidifier 11 should be made from demineralized or contain distilled water. The transducer 12 may be represented by, for example, a piezoelectric crystal (not shown), mounted adjacent to the humidifier 11. Activation of the transducer 12 causes ultrasonic agitation of the diaphragm in the chamber which vibrates the glass chamber so as to generate an aerosol spray from the precursor boron solution.

A source of an inert carrier gas such as $N_2$ or Ar is passed into the aerosol chamber of the humidifier 11 to transport the aerosol droplets formed in the humidifier 11. The carrier gas 15 containing the aerosol droplets is projected into a conduit 16 at a flow rate corresponding to the flow rate of the carrier gas 15. The conduit 16 is connected to a furnace 17 into which the carrier gas 15 and aerosol droplets flow. At the same time a source of nitriding gas 18 is separately fed into the furnace 17 at a flow rate proportional to the flow rate of the carrier gas 15. A range of gas mixtures may be used, however, the preferable gas mixture proportions are below 2(nitrogen):1(ammonia). Ratios below 2:1 are preferred because ratios above 2:1 result in reduced nitriding characteristics. The nitriding gas 18 mixes with the aerosol droplets fed into the furnace causing a reaction which forms particles of $BN_xO_y$, the boron nitride precursor. The particles of $BN_xO_y$ will be of spherical shape provided the aerosol droplets are formed as herein taught and the furnace is adequately heated. The reactive nitriding gas is preferably ammonia although other less preferred reactive gases include nitrogen, nitrogen/hydrogen mixtures, allyl amines, hydrazine, cyanarnide, and dicyanamide, or mixtures thereof.

The furnace 17 should be heated to a temperature of between 600° C. and 1500° C. or higher causing a reaction between the boron containing aerosol droplets and the nitriding gas to form a precursor product of spherical particles of $BN_xO_y$. The spherical precursor particles are carried by the inert carrier/nitriding gas stream through the furnace 17 where the particles are captured on a nylon filter 19 with a maximum pore size of 0.45 $\mu$m. Substantially dense particles are obtained at the low end of the temperature range and a mixture of hollow and dense particles at the high end. When the filter unit is opened, the collected powder is immediately transferred to a desiccator (not shown) for storage of the precursor product or for transfer to another furnace (not shown) for additional calcining preferably in an ammonia rich atmosphere at a furnace temperature of 1000° C. or higher to form dense BN particles of spherical shape with B/N=1/1 and having a hexagonal or turbostratic structure. The time and temperature of additional calcination and post-nitriding, will determine the residual oxygen content and consequently, the final degree of crystallinity of the BN product. However, it has been further discovered in accordance with the present invention that the calcination time and temperature are inversely proportional. Accordingly, the heat treatment time may be shortened by proportionally raising the calcination temperature. The heat treatment step may or may not change the spherical morphology of the BN particles, depending on the calcination conditions.

The flow rate of the gases can be varied to alter the residence time of the particles in the furnace 17. With one reactor configuration total flow rates of the order of 5.5 L/min were used to provide a residence time of about one minute. The flow rate can be either increased or decreased depending on the contact time desired. However, the $N_2/NH_3$ ratio is an important if not critical parameter of the present invention. If the above designated ratio exceeds about two (2), the thermal decomposition products of boric acid, metaboric acid or boric anhydride, will form.

Figure 6A:
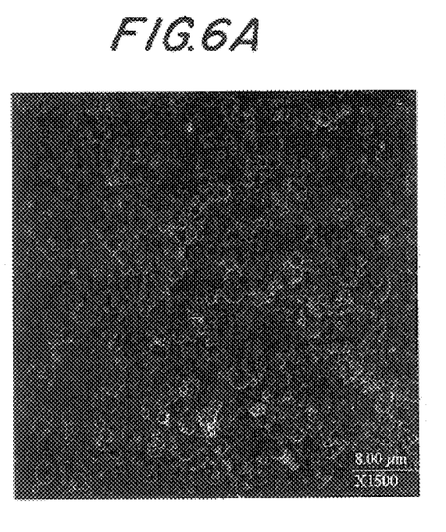
FIG. 6 shows yet another set of scanning electron microscope micrographs of a $BN_xO_y$ precursor product formed in accordance with the present invention and annealed at 1000° C. in ammonia for seven days under the same magnification levels used in FIG. 2.
Figure 6B:
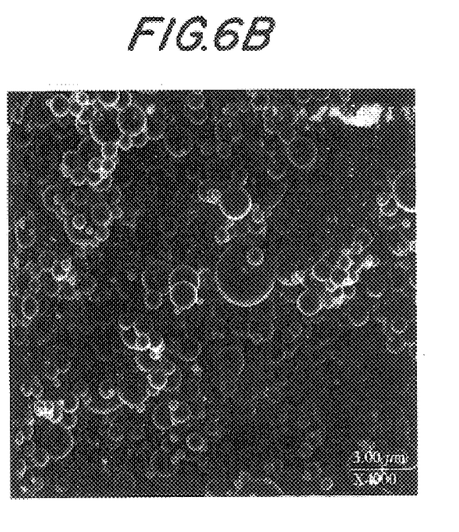
Figure 6C:
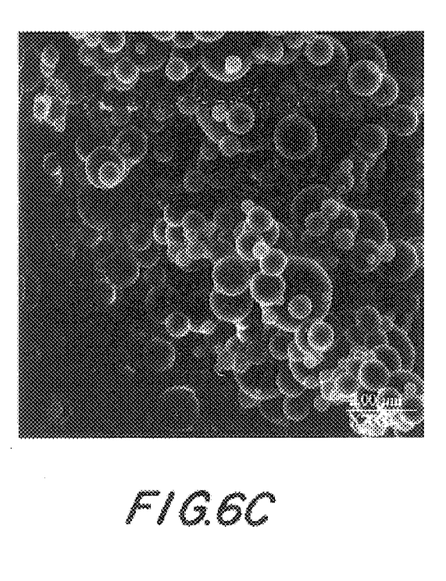
Figure 7A:
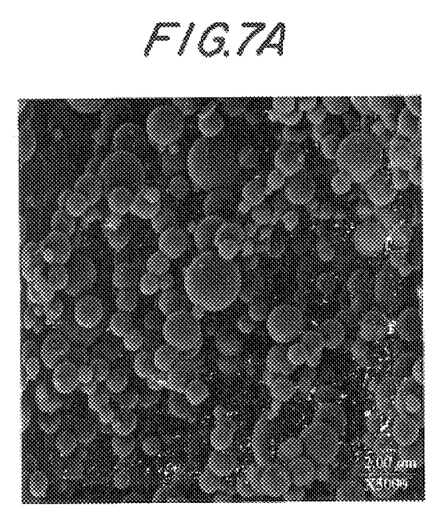
FIG. 7 shows yet another set of scanning electron microscope micrographs of calcined $BN_xO_y$ precursor product formed in accordance with the present invention and annealed at 1700° C. in ammonia under various conditions. These four samples represent four of the possible morphologies obtained for the crystalline h-BN.
Figure 7B:
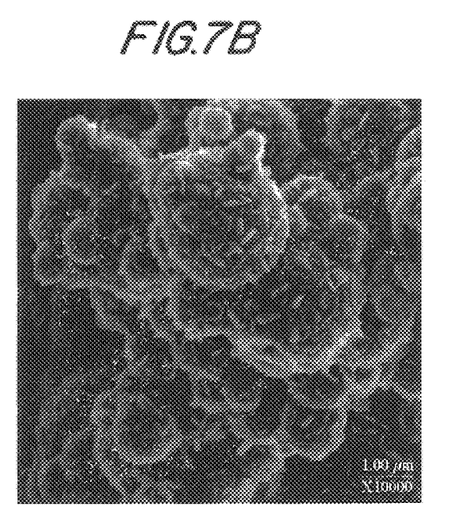
Figure 7C:
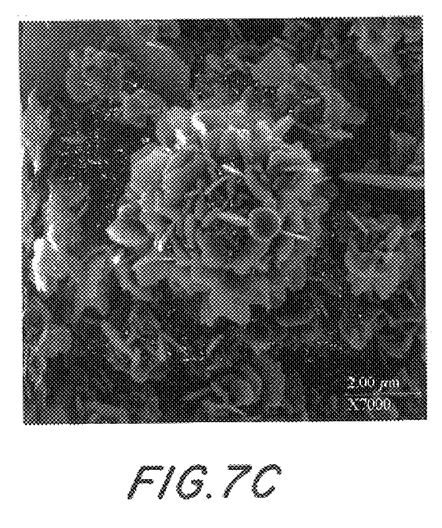
Figure 7D:
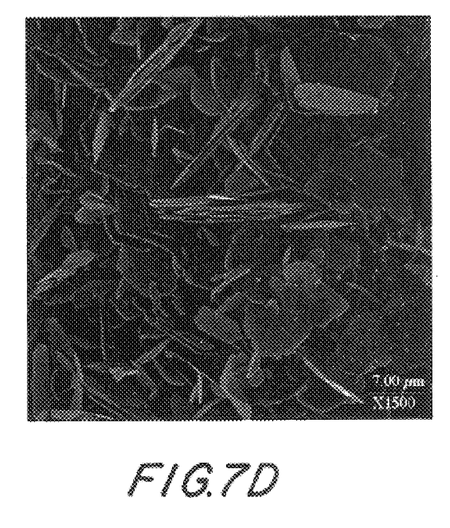

X-ray photoelectron spectroscopy (XPS) and powder X-ray diffraction (XRD) were used to characterize the composition and crystallinity of the $BN_xO_y$ and BN spherical shaped powders formed from the process of the present invention. The XRD patterns, as evident in FIG. 3, permit BN, $BN_xO_y$ precursor, and the thermal decomposition products of boric acid to be differentiated. The geometry, morphology and particle size distribution of the product particles were determined using scanning electron microscopy (SEM) as shown in FIGS. 2, 4 and 6 respectively.

The following Table 1 lists seven (7) runs corresponding to different process variables and/or reactants to substantiate this invention.

TABLE 1

Aerosol Assisted Vapor Synthesis of Spherical $BN_xO_y$ Precursor Particles

| Run No. | B. Reactant* | $N_2$ (L/min) | $NH_3$ (L/min) | Temp. (° C.) |
|---|---|---|---|---|
| GP095 | $H_3BO_3$ | 3.0 | 2.2 | 800 |
| GP097 | $H_3BO_3$ | 3.0 | 2.2 | 1100 |
| GP099 | $H_3BO_3$ | 1.0 | 2.2 | 1000 |
| GP101 | $H_3BO_3$ | 3.0 | 2.2 | 1000 |
| GP105 | $(NH_4)_2B_{10}O_{16}$ | 3.0 | 2.2 | 1000 |
| GP111 | $H_3BO_3$ | 5.0 | 0 | 1000 |
| GP115 | $H_3BO_3$ | 3.0 | 2.2 | 600 |

*Saturated aqueous solution under ambient conditions.

Figure 3:
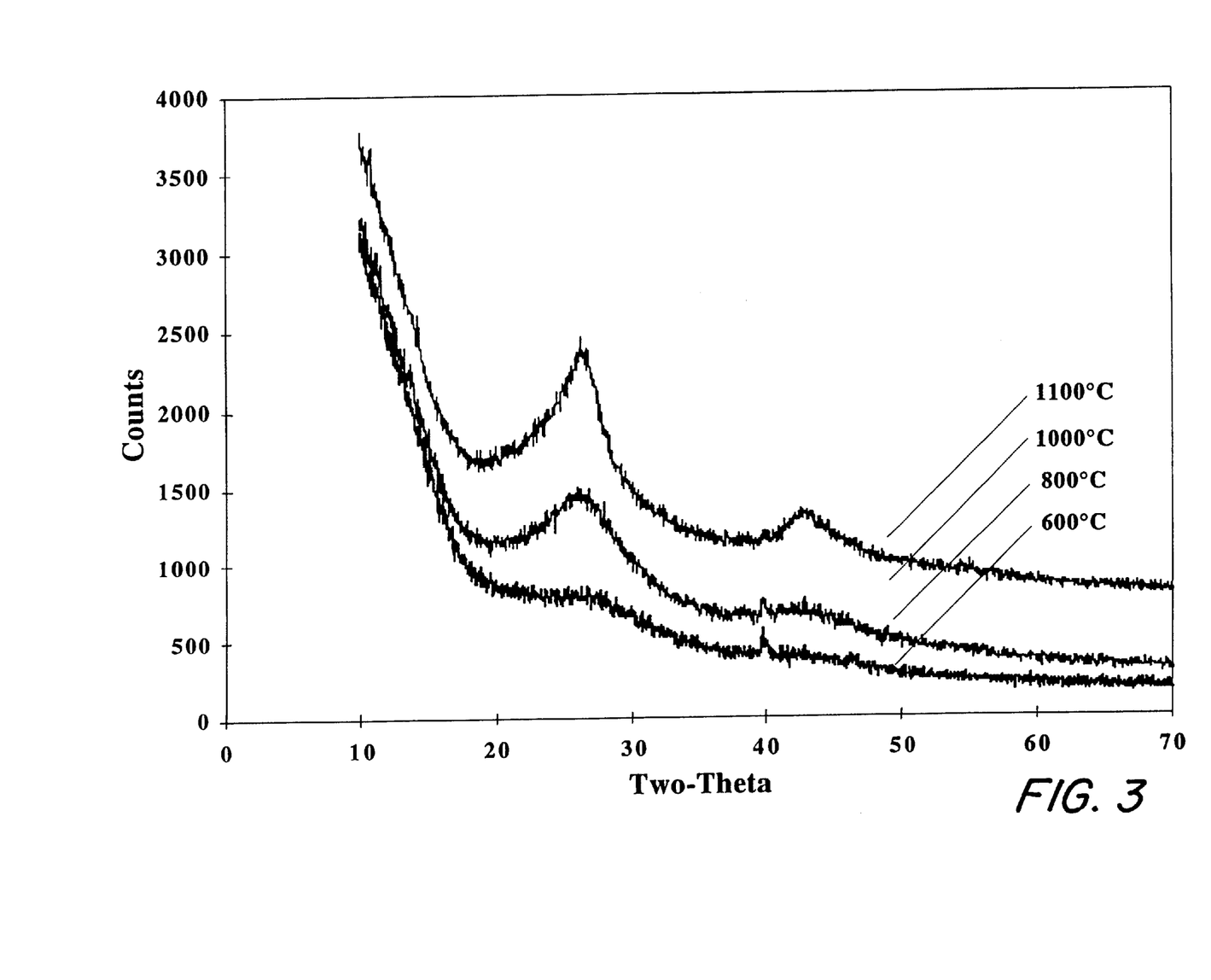
FIG. 3 shows the powder X-ray diffraction patterns of $BN_xO_y$ precursor powders of the present invention formed from boric acid and ammonia under four different temperature conditions.
Figure 4A:
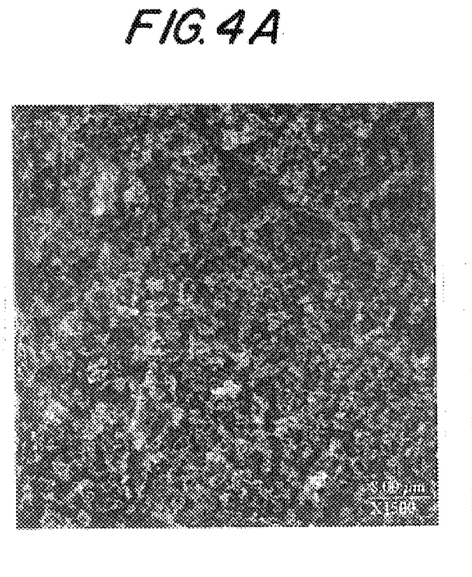
FIG. 4 shows a plurality of scanning electron microscope micrographs of a $BN_xO_y$ precursor product formed at 1000° C. in accordance with the present invention from boric acid and nitrogen in the absence of ammonia at the same magnification levels of FIG. 2.
Figure 4B:
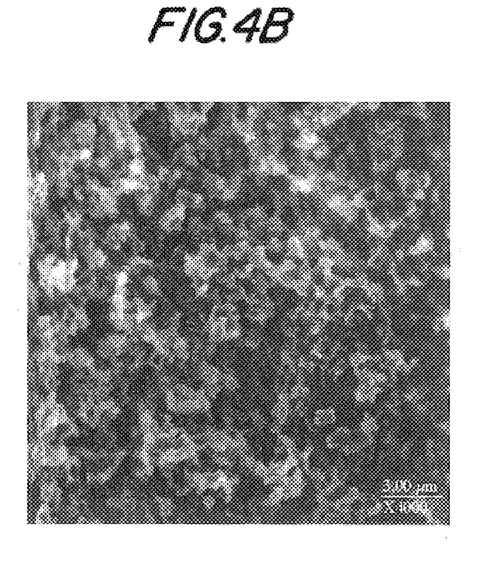
Figure 4C:
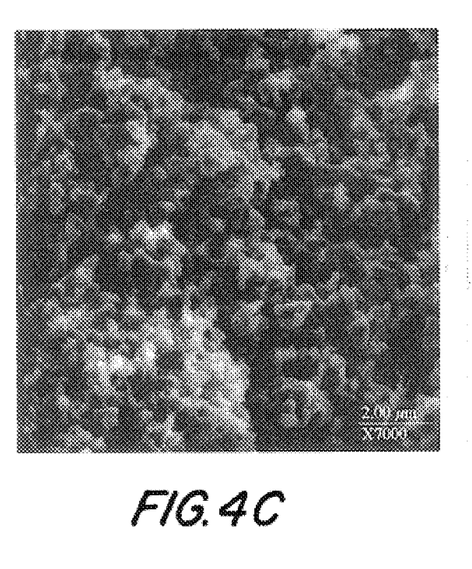
Figure 4D:
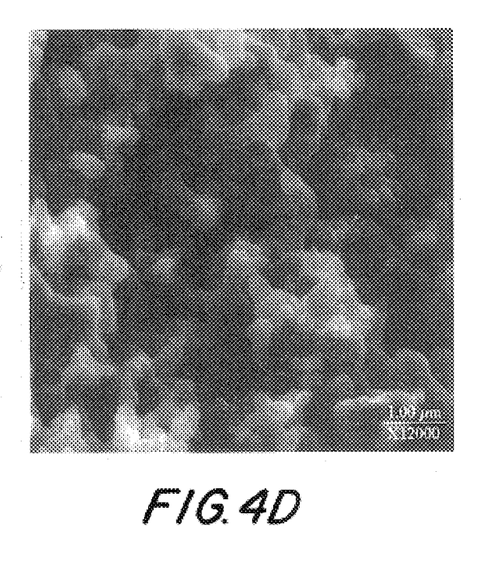
Figure 5A:
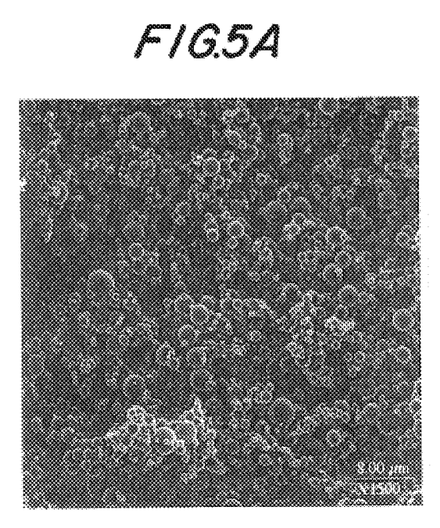
FIG. 5 shows another set of scanning electron microscope micrographs of a $BN_xO_y$ precursor product formed at 1000° C. in accordance with the present invention from ammonium pentaborate $(NH_4)_2B_{10}O_{16} \cdot 8H_2O$ and ammonia under the same magnification levels used in FIGS. 2 and 4.
Figure 5B:
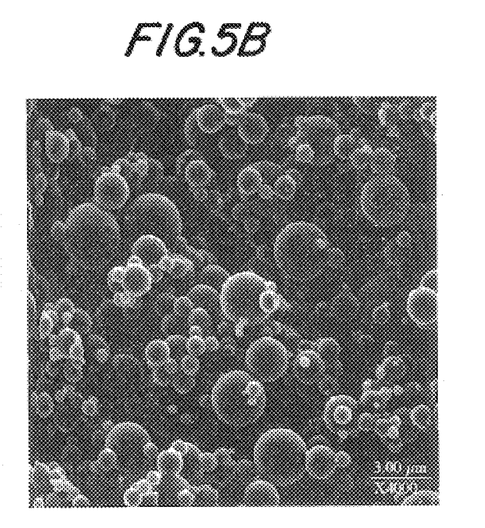
Figure 5C:
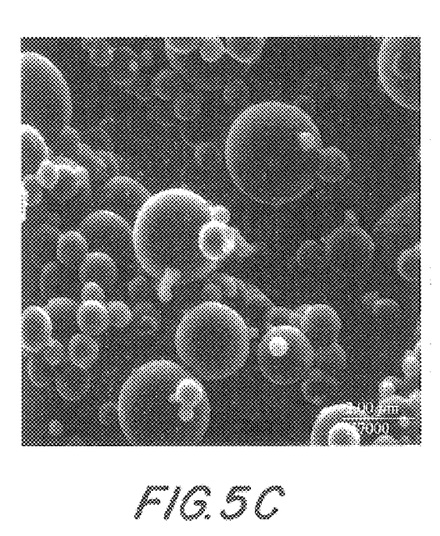
Figure 5D:
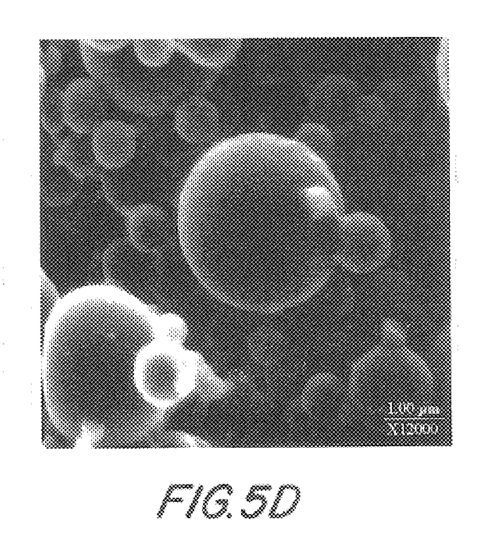

The product from Run GP101 consisted of a white powder. The SEM (FIG. 2) of GP101 shows the powder as consisting of spherical particles with diameters ranging from about 0.2 to 3.0 microns. There is a small amount of agglomeration and necking that is particularly evident in the 12000×micrograph. However, for the most part, the powder consists of individual spherical particles. The XRD pattern of the GP101 powder of FIG. 3 shows strong, broad reflections in the two regions associated with the strongest diffraction peaks from well crystallized hexagonal BN (h-BN). There are no sharp diffraction peaks, testifying to its mainly amorphous character. The XPS analysis of Table 2 shows that before sputtering with $Ar^+$, GP101 has a B/N ratio of 1.8 (B/N=1.0 for pure BN). The XPS analysis confirmed that oxygen is the other main component of the GP101 powder.

Run GP111 is a repeat of Run GP101, except without $NH_3$. The SEM in FIG. 4 shows that the resultant powder consists of highly agglomerated irregularly shaped particles. The XPS analysis of Table 2 reveals that the particles consist mainly of boron, nitrogen and oxygen (B/N=5.7). The XRD pattern shows the particles to be mainly $HBO_2$. When contrasted with the results obtained in the presence of $NH_3$ (GP101), the following two conclusions are suggested:

1. Ammonia is the preferred reactive gas for the formation of spherical particles from an aqueous solution of boric acid; and
2. Ammonia is superior to nitrogen as the nitriding agent for forming spherical particles from aqueous boric acid solutions under the experimental conditions used. In other words, nitrogen essentially acts as an inert carrier gas not as a nitriding agent.

TABLE 2

XPS (X-Ray Photo Electron Spectroscopy) Derived B/N Atomic % Ratios for $BN_xO_y$ Precursor Powders Made by Aerosol Assisted Vapor Synthesis (AAVS)

| Run No. | Temp. (° C.) | 0 min $Ar^+$ | 5 min $Ar^+$ | 20 min $Ar^+$ |
|---|---|---|---|---|
| GP095 | 800 | 75/25 | 87/13 | 90/10 |
| GP097 | 1100 | 61/39 | 69/31 | 74/36 |
| GP099 | 1000 | 66/34 | 78/22 | 84/16 |
| GP101 | 1000 | 64/36 | 74/26 | 80/20 |
| GP105 | 1000 | 64/36 | 74/26 | 80/20 |
| GP111 | 1000 | 85/15 | 93/07 | 95/05 |
| GP115 | 600 | 82/18 | 90/10 | 92/08 |

In Table 2 the experimental conditions for Run GP105 are identical to those used in GP101 except that ammonium pentaborate octahydrate was used in place of boric acid. The pentaborate solution readily formed an aerosol that produced a size distribution of spherical particles similar to that obtained from the boric acid run, 0.2–3.0 microns (FIG. 5). The result is that the B/N ratios, as determined by XPS, of Run GP105 and GP101 are identical, even after sputtering. The main advantage of using the pentaborate appears to be a higher throughput and a higher theoretical yield based on the boron content.

It should also be noted that size distribution of the particles obtained is a function of the method used to generate the aerosol. Ultrasonic transducers operating at ~1.6 MHz were used to generate the particles obtained in GP101 and GP105. Ultrasonic transducers operating at higher frequencies would produce smaller particles and conversely, lower frequencies would produce larger particles. Other methods of aerosol generation such as spray nozzles and atomizers can also be employed.

Furnace temperature plays an important role in determining the B/N ratio from the precursor $BN_xO_y$ powder formed in accordance with the present invention from an aqueous boric acid solution. The following Table 3 lists the B/N ratios before sputtering obtained from four runs under identical conditions except at different temperatures. As the temperature increases from 600 to 1100° C. the B/N ratios steadily decrease. This held true for the original powders and after Ar sputtering for 5 and 20 min. Higher temperatures appear to favor the replacement of oxygen by nitrogen. In other words, $NH_3$ is a more effective nitriding agent as the formation temperatures increases from 600 to 1100° C.

The variation of the B/N ratio with sputtering time shows that the oxygen concentration increases from the outer surface towards the core of the particles. This is consistent with a diffusion process involving ammonia reacting with the surface of the aerosol droplets and diffusing in toward the core. Bulk chemical analysis of several powders are shown in Table 4. These data follow the trend of increasing nitrogen content with increasing reaction temperature that was observed by XPS characterization. The bulk chemical composition of the $BN_xO_y$ precursor powder annealed under a slow ammonia flow (GPII12527a1) indicates that post-treatment with ammonia results in a low-oxygen composition comparable to currently produced industrial powders.

TABLE 3

XPS Derived B/N Ratios From Four $BN_xO_y$ Precursor Powders Prepared Under Identical Conditions Except at Different Temperatures.

| Run No. | Temp. (° C.) | 0 min Ar+ | 5 min Ar+ | 20 min Ar+ |
|---|---|---|---|---|
| GP115 | 600 | 82/18 | 90/10 | 92/08 |
| GP095 | 800 | 75/25 | 87/13 | 90/10 |
| GP101 | 1000 | 64/36 | 74/26 | 80/20 |
| GP097 | 1100 | 61/39 | 69/31 | 74/36 |

TABLE 4

Bulk Chemical Composition of Spherical Powders.

| Run No. | Temp. (° C.) | Atomic % | | | | |
|---|---|---|---|---|---|---|
| | | B | N | O | H | C |
| GP147 | 600 | 21 | 7 | 34 | 37 | 1 |
| GP095 | 800 | 26 | 12 | 30 | 31 | 1 |
| GP101 | 1000 | 30 | 16 | 27 | 26 | 1 |
| GP143 | 1200 | 33 | 18 | 25 | 22 | 2 |
| GPII2527a1† | 1700 | 50 | 50 | — | — | — |
| Commercial Sample | — | 50 | 50 | — | — | — |

*prepared using ammonium pentaborate
†annealed under $NH_3$ (0.1 L/min) at 1200° C. (4 h), then 1700° C. (4 h).

The surface area and density of the as produced $BN_xO_y$ product as well as some post-calcined samples are shown in Table 5. The post-nitriding calcination can affect both surface area and density. Most of the $BN_xO_y$ precursor powders formed between 600–1500° C. generally have similar surface areas and densities. Removal of oxygen concomitant to the conversion of $BN_xO_y$ to BN, in the post-nitridation calcining can produce BN with surface areas from less than 2 to greater than 100 $m^2/g$. Densities from about 1.6 to 2.2 g/cc have been observed. Since the bulk density of boron nitride is 2.19 g/cc, densities significantly lower imply hollow particles with closed porosity. Therefore, depending on the conditions of post treatment, powders with either low or high surface area, or with closed or open porosity, may be produced.

TABLE 5

Surface Area and Bulk Density of Selected Spherical Powders.

| Run No. | Temp. (° C.) | Surface Area ($m^2$/g) | Density (g/cc) |
|---|---|---|---|
| GP147 | 600 | 1.9 | 1.87 |
| GP101 | 1000 | 2.1 | 1.87 |
| GP143 | 1200 | 2.4 | 1.92 |
| GP135 | 1200† | 16 | 1.92 |
| GP131 | 1400† | 23 | 1.94 |
| GP129 | 1600† | 103 | 1.69 |
| GPII2527a1 | 1700† | 5.6 | 1.94 |
| GPII45a2 | 1200, 1700‡ | 24 | 2.19 |

†These are calcination temperatures for post-nitridation of $BN_xO_y$ made at 1000° C. and calcination times at the reported temperature were 8–12 hours.
‡This sample was calcined at 1200° C. for 4 h, then 1700° C. for 4 h.

The XRD patterns in FIG. 3 illustrate that as the temperature of the aerosol reactor furnace is increased the crystallinity of the precursor BN powder also increases. The small diffraction peak at 40° two-theta is an artifact of the experimental conditions and not from the sample. The trend of increased crystallinity as the temperature increases agrees nicely with the trend to lower B/N ratios with increasing temperature for the same series (Table 3).

In the case of the $BN_xO_y$ precursors derived from an aqueous solution of boric acid reacted with $NH_3$ under controlled flow rate conditions in a furnace at 1000° C., we know from the XPS data of Tables 2 and 3 that the spherical precursor powders contain large concentrations of oxygen in a range of between 10–35%. During the high temperature heat treatment of the precursor powders in $NH_3$ the B/N ratio is increased to 1/1 with loss of $H_2O$ (g) and volatile B-N-O species. The resultant BN spherical particles contain less than about 2% oxygen and give an XRD pattern consistent with turbostratic BN. This is illustrated by a seven day heat treatment of GP101 in $NH_3$ at 1000° C. The SEM micrographs in FIG. 6 reveal that the long time annealing in $NH_3$ did not change the morphology of the spherical particles. The most striking result is shown in Table 4. After the ammonia heat treatment, the B/N ratio approached 1/1 with only a low residual oxygen content even after sputtering in Ar+ for 20 min (GP113 in Table 4). XRD analysis of the heat-treated powder showed no increase in crystallinity.

The crystallinity and morphology of the boron nitride formed as a result of post treatment at elevated temperatures, usually in an atmosphere of ammonia, can be controlled by the calcination temperature and the time spent at the calcination temperature and at lower temperatures enroute to the final calcination temperature. The crystallinity of the final product increases with increasing calcination temperature. Turbostratic BN is generally formed below 1700° C. in the absence of a catalyst or crystallizing agent.

The morphology of the resulting BN particles can change as the crystallite size is manipulated. Spherical particles with both smooth and rough surfaces (due to increasing crystallite size) can be formed. Spheroidal particles consisting of submicron platelets can also be produced. It is also possible to eliminate all remnants of spherical morphology and produce the platelet form of h-BN. Representative morphologies that have been achieved by controlling the post-calcination conditions are shown in FIG. 7.

Certain transition metals, especially copper, are known to promote crystallization of amorphous or turbostratic BN to h-BN. The literature also teaches that the presence of alkaline earth metal oxides, such as CaO, and boron trioxide also promotes crystallization. Alkali metal and alkaline earth metal nitrides, especially $Li_3N$, $Mg_3N_2$, and $Ca_3N_2$ are reported to be promoters for the conversion of h-BN to cubic BN. It is likely that these compounds also will act as crystallizing agents to promote the conversion of amorphous or turbostratic BN to h-BN at high temperatures. The addition of soluble copper, alkali metal and alkaline earth metal salts or borates, to a boric acid or ammonium borate aerosol solution will provide $BN_xO_y$ precursor powders doped with potential crystallizing agents to promote the formation of h-BN. Copper will probably be present as elemental copper. In contrast, the alkali and alkaline earth metals will be present in the form of their nitrides and/or borates.

EXAMPLE 1

Formation of Spherical $BN_xO_y$ Spheres

Five grams of boric acid ($H_3BO_3$) was dissolved in 150 mL of distilled water, forming a solution. The solution is fed into a glass chamber fitted with a polyethylene diaphragm at the bottom. The glass chamber is placed in the base unit of a Holmes humidifier. Activation of the humidifier and its transducer causes ultrasonic agitation of the diaphragm on the glass chamber resulting in the generation of an aerosol from the precursor solution. Nitrogen gas is passes into the glass chamber at a rate of 3 L/min. The aerosol vapor is carried out of the glass chamber through a polypropylene tube that leads to a mullite tube (3.5" in diameter by 60" long) inside a Lindberg three zone tube furnace operating at 1000° C. Ammonia is simultaneously fed into the tube furnace at 2.2 L/min. The gas mixture reacts with the aerosol droplets forming $BN_xO_y$ precursor spheres. The spherical precursor particles are captured on a nylon filter with a maximum pore size of 0.45 μm.

Calcination of the $BN_xO_y$ Precursor Spheres and Formation of Crystalline BN

Five grams of $BN_xO_y$ precursor spheres were placed in a pyrolitic BN boat. This boat was then placed in an alumina tube (2" diameter by 42" length) inside a Lindberg furnace. The furnace was sealed with stainless steel endcaps and purged with nitrogen gas (1 L/min) for 5 minutes. The ammonia flow was then turned down to 0.1 L/min and left at this rate for the entire calcination. The furnace was then turned on and the temperature increased to 1700° C. at a ramp rate of 4° C./min. The furnace was held at 1700° C. for 8 hours and then returned to room temperature at a rate of 4° C./min.

What we claim is:

1. A method for forming spherically shaped $BN_xO_y$ precursor particles comprising the steps of:
   a) dissolving a boron compound into an aqueous solution,
   b) forming aerosol droplets from said boron containing aqueous solution;
   c) combining said aerosol droplets with an inert carrier gas to form a combined gas stream of said inert carrier gas and said aerosol droplets at a predetermined flow rate;
   d) feeding said combined gas stream at said predetermined flow rate into a furnace,
   e) maintaining the temperature in said furnace at a temperature of 600° C. to about 1500° C.; and
   f) injecting a gaseous nitriding agent into said furnace simultaneously with the injection of the combined aerosol gas stream whereby substantially spherically shaped $BN_xO_y$ precursor particles are formed in said furnace.

2. A method as defined in claim 1 wherein said inert carrier gas comprises $N_2$.

3. A method as defined in claim 2 wherein the spherical $BN_xO_y$ precursor particles are calcined in gaseous $NH_3$, $N_2$ or an admixture of $NH_3$ and $N_2$ at temperatures above about 700° C. under conditions chosen to give overall spheroidal particles of amorphous, turbostratic or hexagonal BN.

4. A method as defined in claim 2 wherein the spherical $BN_xO_y$ precursor particles are calcined at temperatures above 700° C. in a gaseous nitriding agent selected from the group consisting of: $NH_3$, $N_2$, $NH_3$ and $N_2$, $NH_3$ and Ar, and $NH_3$, $N_2$ and $H_2$ or $NH_3$, Ar and $H_2$, for forming spherical particles of crystalline BN.

5. A method as defined in claim 2 further comprising the step of maintaining the flow rate of said gaseous nitriding agent in a ratio to said predetermined gas stream flow rate at less than about 2:1 whereby substantially spherically shaped $BN_xO_y$ particles are formed.

6. A method as defined in claim 1 wherein said inert gas comprises Ar.

7. A method for forming spherically shaped $BN_xO_y$ particles comprising the steps of:
   a) dissolving a boron compound into an aqueous solution,
   b) forming aerosol droplets from said boron containing aqueous solution;
   c) combining said aerosol droplets with an inert carrier gas to form a combined gas stream of said inert carrier gas and said aerosol droplets at a predetermined flow rate;
   d) feeding said combined gas stream at said predetermined flow rate into a furnace,
   e) maintaining the temperature in said furnace at a temperature of between 600° C. and about 1500° C.;
   f) injecting a gaseous nitriding agent into said furnace simultaneously with the injection of the combined gas stream, and
   g) maintaining the flow rate of said gaseous nitriding agent in a ratio to said predetermined gas stream flow rate at less than about 2:1 whereby substantially spherically shaped $BN_xO_y$ particles are formed.

8. A method as defined in claim 7 wherein said aerosol droplets are formed from a boron containing aqueous solution subjected to an aerosol forming step selected from the group consisting of ultrasonic vibration, atomization, spraying through a nozzle and nebulization.

9. A method as defined in claim 8 further comprising the step of calcining the spherically shaped $BN_xO_y$ precursor particles to form dense boron nitride particles of spherical shape and turbostratic or hexagonal crystalline structure.

10. A method as defined in claim 9 wherein the spherically shaped BN particles have a diameter in a range of between about 0.1 and 100 μm.

11. A method as defined in claim 8 wherein said gaseous nitriding agent is selected from the group consisting of nitrogen, nitrogen/hydrogen, ammonia, alkylamines, hydrazine, cyanamide and dicyanamide.

12. A method as defined in claim 11 wherein the boron compound dissolved in the aqueous solution is selected from the group consisting of boric acid, an ammonium borate, ammonium penaborate, metaboric acid, boric anhydride and complexes of boric acid or boric anhydride with organic ligands of low carbon content and complexes of boric acid or boric anhydride with a compound selected from the group consisting of hydrazine, alkylamines, nitrogen rich polyamines, methyl hydrazine, dimethyl hydrazine, hydroxylamine, hydrazoic acid, melamine, urea, biuret, cyanamide and dicyanamide.

13. A method as defined in claim 12 wherein a water soluble agent is added to the aerosol solution to promote the formation of crystalline h-BN selected from the group consisting of: a metal nitrate, metal borate, earth metal(s), and copper at a concentration of about 1 to 10 atom % based on the boron content of the solution.

14. A method as defined in claim 7 wherein said inert carrier gas comprises $N_2$.

15. A method as defined in claim 7 wherein said inert gas comprises Ar. copper at a concentration of about 1 to 10 atom % based on the boron content of the solution.

16. A precursor composition for forming solid boron nitride particles which comprises boron, nitrogen and oxygen in a substantially uniform spherical shape and having a size of between about 0.01 and 100 μm, and an atomic composition of about $BN_xO_y$ where x=0.1–0.9 and y=0.1–0.9.

* * * * *